United States Patent Office 2,939,247
Patented June 7, 1960

2,939,247
POROUS CERAMIC PLANT HUSBANDRY EQUIPMENT AND METHODS OF PRODUCTION THEREOF

Henry J. Palumbo, Somerville, N.J., assignor to Johns-Manville Corporation, New York, N.Y., a corporation of New York No Drawing. Filed May 24, 1956, Ser. No. 586,899

9 Claims. (Cl. 47—34)

This invention relates to fluid-permeable ceramic plant husbandry equipment which has been rendered parasitic minor plant growth proof and to methods for the production thereof. In other words, this invention concerns porous flower pots, hothouse equipment, flower boxes, seed beds and similar articles made of porous ceramic material which has been treated to prevent the growth of fungi, algae, or other parasitic minor plants upon the surface or within the pores thereof, and also new methods for the manufacture of such treated ceramic ware. As employed herein, the term "ceramic" embraces not only clay and earthenware materials more conventionally designated "ceramic," but also cementitious materials perhaps not conventionally designated as "ceramic," but porous in nature and presenting similar problems with regard to prevention of parasitic minor plant growth thereon or therein. Such cementitious materials may comprise, for example, cement and aggregate mixes, cement and asbestos mixes or the like.

It is well-known that the same conditions of humidity, temperature and the like which are essential to the successful growth of ornamental and useful plants are also propitious for the attack of ceramic containers in which the plants are grown by fungi, algae, or other parasitic minor plant growths. Such parasitic plant growth upon plant containers is highly undesirable for a number of reasons. First, such parasitic growths detract from the ornamental appearance of the container and in cases where flower pots and contents are sold by florists, it is often necessary for the florist before a sale can be made either to wash the pot or wrap it with some other covering material, place it in a surrounding jardiniere, or to re-pot the contents in a new container. All of these procedures are disadvantageous because they involve a cost factor which is quite significant, over a period of, say, a year's time, and because they frequently result in some damage to the plant. Secondly, the parasitic plant growths which attack flower pots or similar horticulture equipment are often of a slimey nature, which makes it difficult to handle the container, particularly if it is wet. Finally, if the parasitic growth upon the ceramic article becomes heavy or severe enough, it can have detrimental effects upon the growth of the desired plant within the container by filling up the pores of the container and shutting off the supply of air to the roots of the contained plant through the pores of the container, by harboring destructive organisms which may attack the desired plant, or in other ways.

Although the detrimental effects of the growth of fungi, algae or other parasitic minor plants upon horticulture equipment have long been known, and a number of ways have been devised to prevent the occurrence of such parasitic growths, the known solutions for the problem have left much to be desired. For example, it is known that it is possible to prevent or mitigate the growth of parasitic minor plants upon flower pots or other similar ceramic articles by glazing the article with a silicate layer or coating it with paint, enamel or the like. This, however, renders the container impermeable to air and other fluids and prevents the roots of plants surrounded by the glazed or enameled container from breathing through the container walls.

Attempts have also been made to overcome this parasitic growth problem by treating or impregnating porous ceramic articles with various commercial fungicides in different concentrations, but such procedures have been found to be generally unsatisfactory in preventing parasitic plant growth upon the containers for any satisfactory length of time when subjected to watering and similar growth producing operations. Furthermore, it has been found that any substantial concentration of commercial fungicide in the porous container can be injurious to the growth of the plants contained therein.

A principal object of this invention is the provision of new forms of flower pots, flower boxes, hothouse equipment, plant receptacles, bulb dishes, jardinieres, earth boxes, cold-frame parts, seed boxes, planters, or similar ceramic plants husbandry equipment of the fluid-permeable type. Further objects include:

(1) The provision of new improvements in the manufacture of porous ceramic flower pots, hothouse equipment or similar ceramic plant husbandry equipment.

(2) The provision of new methods for rendering porous ceramic plant husbandry equipment resistant to attack by parasitic minor plant growths without destroying the air permeability thereof.

(3) The provision of flower pots, hothouse equipment and similar ceramic plant husbandry equipment which are permeable to air while being resistant to growth thereon or therein of fungi, algae, or other parasitic minor plants.

(4) The provision of new forms of porous plant containers, hothouse equipment or the like which may be used under greenhouse conditions or similar circumstances of high humidity, light intensity and temperature propitious to the growth of parasitic minor plants, e.g., fungi or algae, and still remain practically free of such parasitic growths when so used, even over extended periods of time, and which at the same time are free of any toxic effects upon the desired plants grown therein or therewith.

(5) The provision of new fluid permeable ceramic plant husbandry equipment which is free of the tendency of water-soluble salts to leach therethrough and to deposit upon the surface thereof when such equipment is used for the growing of desirable plants.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished according to the present invention by treating a porous ceramic flower pot or other plant husbandry article with a water-proofing composition so that the porous article becomes impregnated with the composition, and thereafter drying or otherwise treating the impregnated article to remove any volatile components of the impregnation composition such as by evaporation, and leave a non-volatile, water-insoluble water-proofing agent within the pores and upon the surface of the porous ceramic article. The porous ceramic article can be impregnated using a water-proofing composition in the form of an organic solvent solution, a water solution, an emulsion, or vapors of a water-proofing agent. The impregnation may be accomplished by spraying the composition onto the article, by coating the article in the manner of brush painting, or by directly immersing the article in a body of the composition. Following the impregnation of the ceramic article, volatile components of the composition can be removed or transformed into non-volatile materials by air-drying or by heating the impregnated article.

If a water-proofing agent of a normally gaseous nature or one which can be volatilized without decomposition is employed, the impregnation of the porous ceramic article can be accomplished by placing it in an atmosphere composed in whole or in part of the gaseous or volatilized water-proofing agent. Following such vaporous impregnation of the article, the impregnated structure is subjected to heat or other conditions which will transform the wtaer-proofing agent into a non-volatile form and fix the agent to the porous ceramic article.

A more complete understanding of the new products and methods of this invention can be had by reference to the following examples, which describe actual productions of new plant husbandry equipment in accordance with this invention. In these examples, all parts or percentages are by weight unless otherwise specified.

Example I

Porous ceramic flower pots of the common red clay type are immersed in a 2% solution of an organopolysiloxane in a relatively low boiling aromatic hydrocarbon solvent for approximately ten minutes. The solution impregnated flower pots are then withdrawn from the water-proofing agent bath, and allowed to drain. Next, the pots are air-dried for two hours and finally baked for approximately fifteen minutes at 300° F.

The resulting flower pots have approximately the same general appearance as untreated pots, although water brought in contact with them stands as small droplets upon the sides of the pots rather than quickly soaking into the pots as is the case with untreated ones.

A variety of different plants are potted into the treated flower pots and are grown therein under suitable greenhouse conditions for over one-half year. During all this time, it is found that the pots remain substantially completely free of any fungi or algae growth thereon. Also, the pots are found to be free from outer surface deposits of water-soluble salts which tend to leach out during successive waterings. Furthermore, it is found through comparison with control plants grown at the same time and under the same conditions in untreated pots, that the plants suffered no ill effects from the treated pots.

In other cases, similar results were obtained using organopolysiloxane solutions ranging from 0.015 to 5% concentration, impregnation times of 5 to 30 minutes, air-drying times of 0.5 to 8 hours and baking times of 5 to 30 minutes at 150 to 350° F.

Example II

An impregnation solution is prepared by dissolving 3 parts of sodium methyl siliconate in water. Porous ceramic pots are immersed in a bath of this solution for 10 minutes, withdrawn, and allowed to drain for several minutes. They are then air-dried for several days, during which time the impregnated water fully evaporates and the siliconate becomes fixed to the ceramic material.

The resulting pots are generally similar in appearance to those prepared as in Example I. Furthermore, actual tests of the pots under greenhouse conidtions result in the same freedom from attack by parasitic minor plant growths and leaching of water-soluble salts to the surface, as was noted in connection with the greenhouse testing of the pots of Example I.

Substantially similar results are obtained in further cases in which water solutions of the water-proofing agent, i.e., sodium methyl siliconate, ranging in concentration from 0.03 to 5.0% and immersion times to effect impregnation of from five minutes to thirty minutes are employed.

Example III

A water-proofing agent solution is prepared by dissolving about 3% of stearate chromic chloride in a volatile hydrocarbon solvent. Common porous clay flower pots are impregnated with the resulting solution by immersing the pots in a bath of the solution for about fifteen minutes, withdrawing the pots and permitting them to drain for a few minutes. The impregnated pots are then baked at about 200° F. for about fifteen minutes to thoroughly dry the pots and set the non-volatile residue of the treating solution in the pores of the ceramic material.

The resulting treated pots have a greenish coloration as a result of the water-proofing treatment and do not soak up water dropped thereon, although they remain permeable to air and other gases. Use of the ports under actual greenhouse growing conditions demonstrate the pots to be protected against attack by fungi or algae growths after more than one-half year testing. Also, they remain substantially free of deposit on the surface of water-soluble salts which might be leached out of the potting soil during this period of use.

In further cases, similar results are obtained in treating porous clay pots with stearate chromic chloride solutions of concentration from 0.25 to 5% for immersion times of five to thirty minutes, and air-drying for one to two days without baking, or with baking of the drained pots at temperatures from 150 to 300° F. for periods of time ranging from about 10 to 60 minutes.

An essential element, of course, for carrying out the methods of this invention and producing the new horticultural equipment is a suitable water-proofing composition. Various water-proofing agents have been found to be useful for making such compositions, but best results have been obtained with organic water-proofing agents, especially the class of materials known as silicones and the class of material which can be designated as metal salts of fatty acids.

In the class of silicones, examples of usable water-proofing agents include sodium methyl siliconate, silicone resins and organo-polysiloxanes.

In the class of metal fatty acid salt water-proofing agents, usable materials include aluminum and zinc salts of lauric, palmitic, oleic and stearic acids and heavy metal complex fatty acid salts such as stearate chromic chloride, or the corresponding acyl metal chlorides of the previously named fatty acids.

With water-proofing agents which are water-insoluble, organic solvent solutions or water dispersions or emulsions may be used as the impregnating fluids. Where water-soluble impregnating materials are employed which, upon air-drying, heating, or in the presence of suitable curing or polymerizing agents or in contact with the ceramic article transform into water-insoluble materials, water solutions may be used to create the impregnating fluids. On the other hand, the impregnating fluid may constitute a gaseous atmosphere, as would be the case with the use of certain of the monomeric organosiloxanes.

The concentration of active water-proofing agent in the compositions used to impregnate the ceramic materials its not critical. However, the concentration should not be so great that the pores of the ceramic material are completely filled or so that the treated ceramic article acquires a continuous surface coating such as would result when the article is painted or varnished. Most satisfactory results have been found to be obtained when solutions or dispersions comprising 0.01 to 5% of the water-proofing agents are used.

The amount of non-volatile water-proofing agent which is incorporated in the porous ceramic article in order to create the parasitic growth proof body is not critical. As indicated, it should not be so great as to completely fill the pores of the ceramic or create a varnish-like surface. Considerable latitude below this amount is possible, but sufficient should be incorporated to render the article substantially unwettable by water, i.e., to render the article so that water applied to the article will stand as droplets thereon rather than be soaked into the ceramic as would be the case of an untreated article.

It is necessary to dry and set the water-proofing agent within the ceramic article following impregnation. Unless a water-proofing agent is employed which requires curing or polymerizing in order to produce the final desired product, air-drying at room temperature can be employed for this purpose. On the other hand, greater speed of production can usually be obtained by baking or heating the impregnated ceramic at elevated temperatures. The temperature for this operation is not critical, although it should be held safely below the decomposition temperature for the water-proofing agent. Usually temperatures of 150 to 350° F. are satisfactory with baking times of five minutes to several hours. Of course, the holding time at the elevated temperature will generally vary inversely with the temperature employed. Where curing or polymerization of the impregnated material is required, suitable heat or other reaction conditions required to bring about the curing will be employed.

The methods of this invention do not require any special equipment or apparatus, and they may be carried out by using hand operations, such as by a home hobbyist or a small greenhouse operator, or they may be employed by high production manufacturers using large capacity conveyors, immersion or spray equipment and drying ovens.

New procedures of this invention are useful in protecting all varieties of porous ceramic plant husbandry equipment against the attack of parasitic minor plant growths. Examples of equipment to which the invention has been found applicable include flower pots, flower boxes, earth boxes, planters, bulb dishes, jardinieres, and all ceramic hothouse equipment such as trays, dividers, supports and the like. Such articles can be made from any of the standard materials used to produce porous equipment of this type, e.g., clay, earthernware, cement and aggregate mixes, cement and asbestos mixes or the like, and the term "ceramic plant husbandry equipment" as used herein and throughout the appended claims is meant to include all of these types of articles.

Ceramic equipment treated in accordance with this invention is protected against growth in or upon it of most parasitic minor plants, including the minute forms of pteridophytic plants or moss, thallophytic plants or fungi, including that commonly called mildew, and algae plants. Furthermore, the new treated ceramic articles of this invention do not become disfigured or discolored during use by outer surface deposits of white or colored salts which commonly occur on flower pots or other horticultural equipment during extended use to leaching out of water-soluble salts from the soils or the like contained within the pot or other article. At the same time, no detrimental effects upon desired plants grown or raised in, or by the use of the treated ceramic articles have been found to occur. Accordingly, it will be apparent from the foregoing description of the invention that it provides a simple, but highly effective solution to several of the long-standing problems which have been associated with the use of ceramic plant husbandry equipment.

What I claim is:

1. Porous ceramic plant husbandry equipment which is permeable to air while at the same time resistant to attack by parasitic minor plant growths comprising a porous ceramic form impregated with an organic water-proofing agent in such amount to render the form substantially unwettable by water while it remains permeable to air.

2. Porous ceramic hothouse equipment upon which parasitic minor plants do not grow even during use thereof in hot, humid atmospheres for extended periods of time, comprising a ceramic porous hothouse article impregnated with a water-proofing agent in such amount that the article is substantially unwettable by water while it remains permeable to air.

3. Porous ceramic flower pots which have been rendesired resistant to attack by parasitic plant growths by impregnation with an organic water-proofing agent in such amount that the article is substantially unwettable by water while it remains permeable to air.

4. Fungi and algae proofed porous ceramic plant husbandry equipment which has been impregnated with organic water-proofing agent in such amount as to render same substantially unwettable by water while it remains permeable to air.

5. The method of treating porous ceramic plant husbandry equipment to render the same fungi and algae proof, which comprises impregnating a porous ceramic plant husbandry article with a solution of an organic water-proofing agent of such concentration relative to the quantity of solution impregnated into said article that upon evaporation of the volatile components of the solution, the article remains permeable to air and then evaporating the volatile components from the solution impregnated article to leave a dry article containing the non-volatile components of said solution.

6. The method of claim 5 wherein said solution is an organic solvent solution of an organic silicone.

7. Air-permeable, ceramic plant husbandry equipment which has been rendered parasitic minor plant growth-proof by impregnation with an organic water-proofing agent in such amount that the article is rendered substantially unwettable by water while it remains permeable to air.

8. Air-permeable, ceramic plant husbandry equipment which has been rendered parasitic minor plant growth-proof by impregnation with the metal salt of a fatty acid in such amount that the article is rendered substantially unwettable by water while it remains permeable to air.

9. Air-permeable, ceramic plant husbandry equipment which has been rendered parasitic minor plant growth-proof by impregnation with an organic silicone in such amount that the article is rendered substantially unwettable by water while it remains permeable to air.

References Cited in the file of this patent

UNITED STATES PATENTS

| | | |
|---|---|---|
| 1,785,101 | Sutherland | Dec. 16, 1930 |
| 2,189,889 | Engel | Feb. 13, 1940 |
| 2,472,799 | Hyde | June 14, 1949 |
| 2,567,110 | Hyde | Sept. 4, 1951 |
| 2,574,168 | Brick | Nov. 6, 1951 |
| 2,726,176 | Hatcher | Dec. 6, 1955 |

FOREIGN PATENTS

| | | |
|---|---|---|
| 44,940 | Germany | Sept. 21, 1888 |
| 728,930 | Great Britain | Apr. 27, 1955 |

OTHER REFERENCES

Publications: Jones, "Flower Pot Composition and its Effect on Plant Growth," published Oct. 1931 as Bulletin 277, by Massachusetts Agricultural Experiment Station, Amherst, Mass. Cover page and pages 148 through 161 in all. Pages 148, 155, 159 are relied on.

Trademark Registration 562,764, Aug. 12, 1952 to Aktiebolaget Bofors, for Bonomold-O.

Trademark Registration 578,730, August 18, 1953 to Aktiebolaget Bofors, for Bonomold-O.

Hedlund: "Recent Developments in Silicone coating Resins," published May 1954 in Official Digest of the Federation of Paint and Varnish Production Clubs, vol. 26, No. 352, pages 356 through 367. Only page 365 is relied on.

UNITED STATES PATENT OFFICE

CERTIFICATE OF CORRECTION

Patent No. 2,939,247                            June 7, 1960

Henry J. Palumbo

It is hereby certified that error appears in the printed specification of the above numbered patent requiring correction and that the said Letters Patent should read as corrected below.

Column 2, line 20, for "plants" read -- plant --; column 3, line 15, for "wtaer-proofing" read -- water-proofing --; column 4, line 18, for "ports" read -- pots --; column 5, line 55, for "use to" read -- use due to --.

Signed and sealed this 29th day of November 1960.

(SEAL)
Attest:

KARL H. AXLINE
Attesting Officer

ROBERT C. WATSON
Commissioner of Patents